Patented Mar. 9, 1937

2,073,316

UNITED STATES PATENT OFFICE 2,073,316

PARA-TERTIARY-OCTYL-NITROPHENOLS

Joseph B. Niederl, New York, N. Y., assignor to Röhm & Haas Company, Philadelphia, Pa.

No Drawing. Application February 18, 1935,
Serial No. 7,069

3 Claims. (Cl. 260—143)

This invention relates to new compounds which are derived from tertiary octyl phenols.

These tertiary octyl phenols may be subjected to various types of chemical treatment by which several different compounds may be obtained. They may for instance, be treated with acylating compounds such as acyl chlorides or acid anhydrides for the purpose of forming substituted phenol esters; or they may be treated with a chloride of an inorganic acid such as phosphorus oxychloride in order to produce the corresponding phosphoric acid ester. Examples of organic acids which may be used are acetic, benzoic, phthalic, etc. The compounds thus made are useful as plasticizers in the manufacture of pyroxylin lacquers and varnishes.

The tertiary octyl phenols may be nitrated so as to form either the mono or dinitro compounds and these may in turn be reduced to the corresponding amino compounds. The dinitro compounds are useful as intermediates, whereas the corresponding amino compounds are useful as photographic developers because of their reducing power.

Many new derivatives may be obtained from the amino compounds by diazotization and subsequently splitting out the azo group or coupling it with phenols. Depending on the reagent used, the diazo group may be substituted by hydroxy, halogen or cyano groups. Dyestuffs may be prepared from the tertiary octyl phenols either by diazotizing one of its amino derivatives and coupling with a phenol or coupling it directly with the diazotized amine. In both cases valuable dyestuffs of this type are obtained.

By treatment with sulfuric acid or fuming sulfuric acid at suitable temperatures both the mono and disulfonic acids may be obtained. Both of these are useful as wetting and tanning agents, particularly the disulfonic acids because of the fact that the sodium salts of the latter are much more readily soluble in water.

The chlorine derivatives of the tertiary octyl phenols may be obtained by treatment with chlorine or sulfuryl chloride. The products are extremely potent germicides, insecticides and important intermediates for the preparation of other materials. The corresponding bromine and iodine derivatives may also be prepared in a similar manner.

By treatment of the tertiary octyl phenols with carbon dioxide and sodium, a tertiary octyl salicylic acid may be obtained which has valuable medicinal properties. The acetyl substituted tertiary octyl salicylic acid which might be called tertiary octyl aspirin, was prepared and showed highly desirable medicinal properties.

By treatment of the tertiary octyl phenols with chloroform and sodium hydroxide, a tertiary octyl salicyl aldehyde may be obtained.

Substituted acetophenones may be made from the tertiary octyl phenol by treatment with acetyl chloride and subsequently heating in an atmosphere of hydrogen chloride in the presence of zinc chloride.

The invention may be illustrated by the following examples but these are not intended as a limitation since the invention may be otherwise carried out within the scope of the appended claims.

Example 1.—Benzoate of p-tertiary octyl phenol. 1 mol. of the sodium salt of p-tertiary octyl phenol (melting point 84° C.) was suspended in 1 liter of water. To this finely divided suspension one mol. of benzoyl chloride was added in small portions while constantly shaking the reaction mixture. The benzoate first separates out as an oil, which can then be crystallized from the lower aliphatic hydrocarbons (melting point 80° C.).

Example 2.—Phthalate of p-tertiary octyl phenol. Equimolar mixtures of p-tertiary octyl phenol and phthalic acid anhydride were heated from 130 to 170° C. on an oil bath. After cooling any unreacted phthalic acid was removed by extraction with hot water and the ester recrystallized from alcohol.

Example 3.—Acetate of p-tertiary octyl phenol. Equimolar mixtures of p-tertiary octyl phenol and acetyl chloride (or acetic acid anhydride) were refluxed four hours. The reaction mixture is then washed with water and distilled.

Example 4.—Phosphate of p-tertiary octyl phenol. 1 mol. of p-tertiary octyl phenol was treated with 1 mol. of phosphorus oxychloride. After the reaction had subsided the mixture was treated with water to remove the phosphoric acid. The phosphate can be used in its crude state for further applications.

Example 5.—Mono nitro tertiary octyl phenol. 1 mol. of p-tertiary octyl phenol was dissolved in three parts by weight of glacial acetic acid. To this mixture one mol. of nitric acid diluted with three parts by weight of glacial acetic acid was slowly added. Upon standing the mono nitro compound settles out as an oil, which solidifies upon cooling below room temperature. It forms insoluble sodium and potassium salts by treating it with concentrated solutions of the respective alkalies. The crude mono nitro product can immediately be used for the preparation of the mono amino compound and no further purification is necessary. The benzoate of the nitro compound melts at 98.5–99° C.

*Example 6.*—Di nitro tertiary octyl phenol. 1 mol. of p-tertiary octyl phenol was dissolved as above, in three parts by weight of glacial acetic acid. To this solution two mols of concentrated nitric acid dissolved in three parts by weight of glacial acetic acid were slowly added. After the solution has stood for about half an hour water is added until the di-nitro compound settles out. The pure di-nitro p-tertiary octyl phenol, when crystallized from ethyl alcohol melts at 68° C.

*Example 7.*—Mono amino derivative of tertiary octyl phenol. The recrystallized Na salt of the mono-nitro compound was dissolved in water, and then refluxed on a steam bath with the calculated amount of tin and HCl. Upon allowing the reaction mixture to cool the mono-amino compound settled out. This was filtered and then washed with ether to remove any unreacted mono-nitro compound. The yield was rather small, but very pure.

*Alternate method.*—The nitration mixture containing the mono-nitro compound in solution with glacial acetic was directly reduced with tin and hydrochloric acid. After heating for one hour on a steam bath the reaction mixture was allowed to cool. A large quantity of hydrochloric acid was then added and the mixture allowed to stand for several hours. Upon standing the amine hydrochloride was precipitated in large quantities. The product is not so pure as in the first method. Melting point—210° C. (uncorrected).

*Example 8.*—Diisobutyl catechol. 1 mol. of the mono-amino p-diisobutyl phenol was dissolved in an excess of concentrated hydrochloric acid, the calculated amount of $NaNO_2$ was slowly added and the diazonium salt then subjected to steam distillation. The diisobutyl catechol (m. p. 104° C.) crystallized from the distillate.

*Example 9.*—Mono iodo diisobutyl phenol. 1 mol. of amino p-diisobutyl phenol was dissolved in an excess of concentrated hydrochloric acid and the calculated amount of sodium nitrite was slowly added to the cold solution. To the resulting solution of the diazonium salt a concentrated solution containing 1 mol. of potassium iodide was added slowly. After the reaction had subsided the mono-iodo diisobutyl phenol was obtained by subjecting the reaction mixture to steam distillation.

In place of the potassium iodide, potassium cyanide, cyanogen chloride, etc., may be used and the corresponding substituted p-diisobutyl phenols obtained.

*Example 10.*—Mono-sulfonic acid of p-tertiary octyl phenol. 1 mol. of p-tertiary octyl phenol is mixed with a slight excess of concentrated sulfuric acid and then heated on a steam bath until the mixture is completely soluble in water. At this stage the reaction mixture is poured into cold water and the mixture is then neutralized with sodium carbonate. The slightly soluble sodium salt of the monosulfonic acid is precipitated out. The monosulfonic acid of p-tertiary octyl phenol is a hygroscopic substance extremely soluble in water and gives a blue coloration with ferric chloride.

*Example 11.*—Di-sulfonic acid of p-tertiary octyl phenol. 1 mol of p-tertiary octyl phenol is treated with slightly more than the calculated amount of fuming sulfuric acid and after the first vigorous reaction had subsided is heated on a steam bath to complete the reaction. After the reaction has ceased the mixture is poured into cold water and neutralized with sodium carbonate. Any mono-sulfonic acid that may have been formed is precipitated out, as its insoluble sodium salt, whereas the sodium salt of the di-sulfonic acid stays in solution. After filtration, the solution is evaporated to dryness. If a high purity of the salt is required the salt is either fractionally crystallized from water or repeatedly reprecipitated from alcohol. The free disulfonic acid of p-tertiary octyl phenol is hygroscopic and extremely soluble in water. It also gives an intense blue coloration with ferric chloride.

*Example 12.*—Mono-chloro tertiary octyl phenol. 1 mol. sulfuryl chloride was placed in a one liter Erlenmeyer flask with one mol. of tertiary octyl phenol, gently refluxed for four hours, and then steam distilled with superheated steam at 150° C. A light yellow colored oil was collected which was distilled in vacuum. At 115–120° C. and 4 mm. pressure a colorless oil was collected which solidified upon cooling in an ice bath. It was recrystallized from petroleum ether. Melting point 27–28° C. Yield almost quantitative. The nitro derivative melts at 106–108° C.

*Example 13.*—Dichloro tertiary octyl phenol. 2 mols of sulfuryl chloride were placed in a one liter Erlenmeyer flask with 1 mol. of tertiary octyl phenol, refluxed for four hours and then steam distilled with superheated steam at 150° C. A yellow colored oil was obtained which was then distilled in vacuum. At 135°–140° C. and 4 mm. a heavy yellow oil was collected which recrystallized upon cooling. It was recrystallized from petroleum ether. Melting point 44–46° C.

*Example 14.*—Mono bromo p-diisobutyl phenol. Into 1 mol. of p-diisobutyl phenol kept at 85° C. 1 mol. of bromine in gaseous form was slowly introduced by means of a slow current of air. The reaction mixture after washing with water and dilute soda solution was dried and distilled. The mono bromo p-diisobutyl phenol melts at 32° C.

In a similar manner the di-bromo derivative was made using 2 mols of gaseous bromide.

Under the same reaction conditions and substituting chlorine for the bromine the corresponding mono- and di-chloro diisobutyl phenols can be obtained.

*Example 15.*—Tertiary octyl (diisobutyl) salicylic acid. 206 grams p-diisobutyl (p-tertiary octyl) phenol were dissolved in 1½ liters of xylene in a 3-necked round bottomed flask containing an inlet tube for dry carbon dioxide and a reflux condenser. While the solution was refluxing and a slow stream of carbon dioxide was passing through the reaction mixture 44 grams of sodium were slowly added over a period of nine hours. Then the reaction mixture was allowed to cool in an atmosphere of carbon dioxide. The precipitated sodium salt of the diisobutyl salicylic acid was freed from the xylene either by decantation of the latter or by centrifuging. The sodium diisobutyl salicylate was then crystallized from water. The free acid is obtained by subsequent acidification with a mineral acid and crystallization from alcohol. Melting point 156.5–157.5° C.

*Example 16.*—Acetoxy diisobutyl salicylic acid. 1 mol. of diisobutyl salicylic acid was refluxed with slightly more than 1 mol. of acetyl chloride or acetic acid anhydride. Upon cooling the acetoxy derivative crystallized out. Melting point 99–100° C.

*Example 17.*—Diisobutyl salicyl aldehyde. The sodium salt of p-diisobutyl phenol was refluxed with a molecular excess of chloroform and sodium hydroxide. The diisobutyl salicyl aldehyde was then isolated from the acidified reaction mixture either by steam distillation or by fractional distillation of the dried oil.

*Example 18.*—Diisobutyl-hydroxy-acetophenones. 1 mol. of p-tertiary octyl phenol was treated with 1 mol. of acetyl chloride and the reaction mixture was then heated in an atmosphere of hydrogen chloride in the presence of $ZnCl_2$. After the reaction had subsided the product was washed in the usual manner and then fractionally distilled in vacuum.

*Example 19.*—Diazotization of p-tertiary octyl phenol with p-nitro aniline. To a molar solution of p-nitro aniline in hydrochloric acid one mol. of sodium nitrite is slowly added at 0° C. To the resulting solution of the diazonium salt of p-nitro aniline hydrochloride a solution of one mol. of the potassium salt of p-tertiary octyl phenol is slowly added. Reaction sets in immediately with the formation of a brown dyestuff, which may then be worked up and used in the conventional manner.

*Example 20.*—1-methoxy-4-(2, 2, 4, 4-tetramethyl)-butyl benzene. 1 mol. of the sodium salt of p-diisobutyl phenol was treated with an equimolecular quantity of methyl iodide in an ethyl alcohol solution. A quantitative yield of the methyl ether of p-diisobutyl phenol was obtained. It boiled at 272° C. and 760 mm. pressure. Other methylating agents such as dimethyl sulfate may be used in place of the methyl iodide.

*Example 21.*—1-methoxy-4 (2, 2, 4, 4-tetramethyl) butyl benzene sulfonic acid-2. The methyl ether of p-diisobutyl phenol as obtained in the foregoing example was treated with concentrated sulfuric acid at moderate temperatures on a steam bath. The resulting product was a crystalline compound soluble in hot water, and moderately soluble in cold water. It decomposes at 180° C. It is an excellent wetting agent and an important intermediate.

I claim:—
1. A p-tertiary octyl phenol having at least one nitro group substituted in the benzene ring, said compound being prepared by the nitration of p-tertiary octyl phenol.
2. p-tertiary octyl mononitro phenol.
3. p-tertiary octyl dinitro phenol.

JOSEPH B. NIEDERL.